(12) United States Patent
Brown

(10) Patent No.: US 9,766,420 B2
(45) Date of Patent: Sep. 19, 2017

(54) APPARATUS AND METHOD FOR ABSORBING LASER ENERGY THAT FAILS TO COUPLE INTO THE CORE OF A LASER FIBER, AND FOR ABSORBING THE ENERGY THAT HAS BEEN TRANSMITTED TO THE CLADDING OF THE LASER

(71) Applicant: Joe Denton Brown, Panama City, FL (US)

(72) Inventor: Joe Denton Brown, Panama City, FL (US)

( * ) Notice: Subject to any disclaimer, the term of this patent is extended or adjusted under 35 U.S.C. 154(b) by 152 days.

(21) Appl. No.: 14/217,927

(22) Filed: Mar. 18, 2014

(65) Prior Publication Data

US 2014/0270661 A1    Sep. 18, 2014

Related U.S. Application Data

(60) Provisional application No. 61/788,238, filed on Mar. 15, 2013.

(51) Int. Cl.
*G02B 6/24* (2006.01)
*G02B 6/42* (2006.01)

(52) U.S. Cl.
CPC .......... *G02B 6/4296* (2013.01); *G02B 6/243* (2013.01); *G02B 6/4206* (2013.01)

(58) Field of Classification Search
CPC ..................................................... G02B 6/243
See application file for complete search history.

(56) References Cited

U.S. PATENT DOCUMENTS

| | | | |
|---|---|---|---|
| 3,912,362 A | 10/1975 | Hudson | |
| 4,316,204 A * | 2/1982 | Inagaki | G02B 6/4202 257/432 |
| 4,474,429 A | 10/1984 | Yoldas et al. | |
| 4,575,181 A | 3/1986 | Ishikawa | |
| 4,678,273 A | 7/1987 | Vilhelmsson | |
| 4,737,011 A | 4/1988 | Iri et al. | |
| 4,762,385 A | 8/1988 | Fuse | |
| 4,868,361 A * | 9/1989 | Chande | G02B 6/32 219/121.62 |
| 4,998,795 A * | 3/1991 | Bowen | G02B 6/243 385/139 |
| 5,097,524 A * | 3/1992 | Wasserman | G02B 6/32 385/73 |
| 5,101,457 A | 3/1992 | Blonder et al. | |
| 5,132,079 A | 7/1992 | Stewart et al. | |
| 5,179,610 A | 1/1993 | Milburn et al. | |

(Continued)

FOREIGN PATENT DOCUMENTS

JP     10246813 A  *  9/1998

*Primary Examiner* — Charlie Y Peng
(74) *Attorney, Agent, or Firm* — Bacon & Thomas, PLLC

(57) ABSTRACT

A fiber optic connector for coupling focused radiant energy from a laser to a fiber optic conductor includes a quartz alignment ferrule that is fused mechanically and optically to the fiber's proximal end, either by an index matching first adhesive or by heat fusing the cladding to the ferrule without removing the cladding from the end of the fiber. The fiber and ferrule are attached to the fiber's proximal termination connector by a second adhesive with a high refractive index which absorbs errant radiant energy that has propagated in the fiber's cladding. The absorbed errant energy is dissipated by the connector assembly as it is converted to heat.

6 Claims, 1 Drawing Sheet

(56) References Cited

U.S. PATENT DOCUMENTS

| | | | |
|---|---|---|---|
| 5,243,681 A | 9/1993 | Bowen et al. | |
| 5,267,342 A * | 11/1993 | Takahashi | G02B 6/266 |
| | | | 385/140 |
| 5,291,570 A | 3/1994 | Filgas et al. | |
| 5,452,392 A | 9/1995 | Baker et al. | |
| 5,490,227 A | 2/1996 | Tanabe et al. | |
| 5,619,602 A | 4/1997 | Sandstrom et al. | |
| 5,668,902 A | 9/1997 | Kurata | |
| 5,829,445 A | 11/1998 | Martin et al. | |
| 5,946,437 A | 8/1999 | Uchida et al. | |
| 6,154,596 A | 11/2000 | Ionov | |
| 6,167,177 A | 12/2000 | Sandstrom et al. | |
| 6,282,349 B1 | 8/2001 | Griffin | |
| 6,317,550 B2 | 11/2001 | Irie et al. | |
| 6,332,721 B1 | 12/2001 | Inokuchi | |
| 6,347,167 B1 | 2/2002 | Hagelin | |
| 6,477,295 B1 | 11/2002 | Lang et al. | |
| 6,488,414 B1 | 12/2002 | Dawes et al. | |
| 6,595,698 B2 | 7/2003 | Gutierrez et al. | |
| 6,597,846 B1 | 7/2003 | Fujii et al. | |
| 7,090,411 B2 | 8/2006 | Brown | |
| 7,918,612 B1 * | 4/2011 | Zhao | G02B 6/2553 |
| | | | 385/95 |
| 2002/0021870 A1 | 2/2002 | Engstrand et al. | |
| 2002/0071459 A1 | 6/2002 | Malone et al. | |
| 2003/0118283 A1 | 6/2003 | Healy | |
| 2005/0191012 A1 * | 9/2005 | McGarvey | G02B 6/4212 |
| | | | 385/88 |
| 2007/0211999 A1 * | 9/2007 | Kobayashi | G02B 6/32 |
| | | | 385/79 |
| 2008/0304799 A1 * | 12/2008 | Xie | C09J 5/06 |
| | | | 385/114 |
| 2008/0305255 A1 * | 12/2008 | Beauvais | G02B 6/08 |
| | | | 427/163.2 |
| 2010/0014814 A1 * | 1/2010 | Taniguchi | G02B 6/4471 |
| | | | 385/77 |

* cited by examiner

APPARATUS AND METHOD FOR ABSORBING LASER ENERGY THAT FAILS TO COUPLE INTO THE CORE OF A LASER FIBER, AND FOR ABSORBING THE ENERGY THAT HAS BEEN TRANSMITTED TO THE CLADDING OF THE LASER

This application claims the benefit of U.S. provisional patent application Ser. No. 61/788,238, filed Mar. 15, 2013, and incorporated herein by reference.

BACKGROUND OF THE INVENTION

1. Field of the Invention

This invention relates to a fiber optic connector and connector system or arrangement for coupling focused radiant energy from a laser to a fiber optic conductor.

2. Description of Related Art

The invention provides an improvement to the connector arrangements disclosed in the Inventor's U.S. Pat. Nos. 5,179,610 and 7,090,411, incorporated by reference herein. In the connectors disclosed in the cited patents, radiation that fails to couple with a small core fiber and radiation which couples with higher order propagation modes is absorbed by the connector or surrounding structures. The improvement permits the use of a fiber with full cladding, thereby making the fiber termination more rugged and simplifying manufacturability.

SUMMARY OF THE INVENTION

A fiber optic connector for coupling focused radiant energy from a laser to a fiber optic conductor includes a quartz alignment ferrule that is fused mechanically and optically to the fiber's proximal end, either by an index matching first adhesive or by heat fusing the cladding to the ferrule without removing the cladding from the end of the fiber. The fiber and ferrule are attached to the fiber's proximal termination connector by an adhesive with a high refractive index which absorbs errant radiant energy that has propagated in the fiber's cladding. The absorbed errant energy is dissipated by the connector assembly as it is converted to heat.

DETAILED DESCRIPTION OF THE PREFERRED EMBODIMENTS

Figure 1:
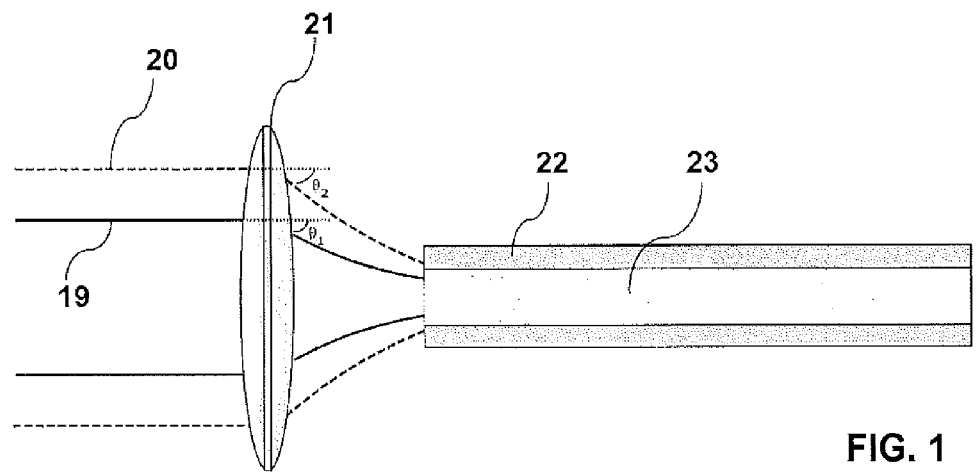
FIG. 1 is a schematic depiction showing the effects of thermal lensing on coupling of a focused laser beam to the core and cladding of the fiber.

As shown in FIG. 1, a laser beam 19 is focused into the fiber core 23 by the laser's focusing lens 21 with a half angle of acceptance ($\theta_1$). However, due to thermal lensing, an expanded beam 20 is focused into both the fiber core 23 and cladding 22 with a half angle of acceptance ($\theta_2$). The present invention uses refractive index matching adhesives to provide a path for dissipation of the energy in the cladding to a heat sink in the form of a ferrule and/or structures in contact with the ferrule.

Figure 2:
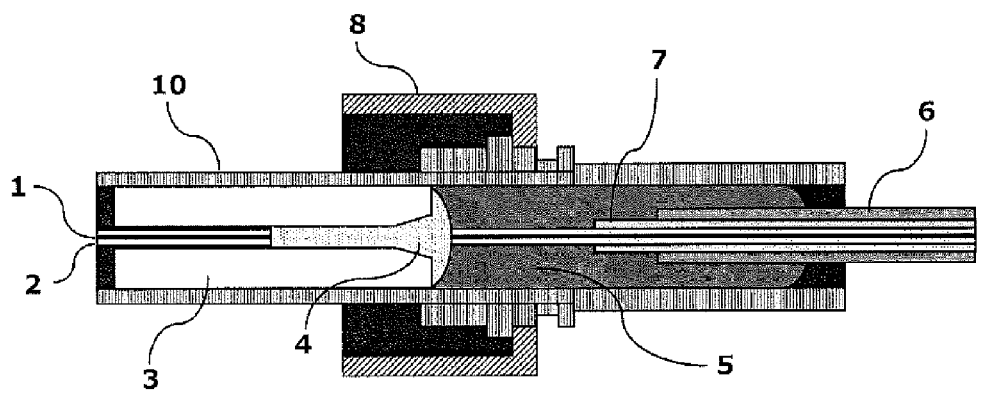
FIG. 2 is a cross-sectional side view of proximal terminal connector constructed in accordance with the principles of a preferred embodiment of the invention.

As shown in FIG. 2, the termination arrangement of a preferred embodiment of the invention is included in a proximal termination connector 10 and threaded nut 8, although the illustrated connector and nut configuration should not be taken as limiting since the invention can be applied to a variety of termination connectors, including ones without nuts.

The fiber inside the connector consists of a fiber core 1, cladding 2, coating 7, and buffer 6. The fiber is fused to the quartz ferrule 3 by a refractive index matching first adhesive 4 or by heat fusing the cladding 2 to the ferrule 3 without removing the cladding from the end of the fiber, and the fiber and ferrule are secured in the connector by a high refractive index second adhesive 5, thereby providing a dissipation path for energy that has coupled to the cladding 2 rather than to the core 1 of the fiber.

Having thus described a preferred embodiment of the invention in connection with the accompanying drawings, it will be appreciated that the invention is not to be limited to the specific embodiments or variations disclosed.

I claim:

1. A fiber optic connector arrangement for coupling focused radiant energy from a laser to a fiber optic conductor, the fiber optic conductor including a core and cladding, comprising:
    an alignment ferrule; and
    an index matching first adhesive for mechanically and optically fusing the alignment ferrule to a proximal end of the fiber optic conductor,
    wherein the fiber optic conductor and ferrule are attached to a connector by a second adhesive with a high refractive index so as to absorb errant radiant energy that has propagated in the fiber optic conductor's cladding.

2. A fiber optic connector arrangement as claimed in claim 1, wherein the ferrule is a quartz alignment ferrule.

3. A fiber optic connector arrangement as claimed in claim 1, wherein the connector is a proximal termination connector with a coupling nut.

4. A fiber optic connector arrangement for coupling focused radiant energy from a laser to a fiber optic conductor, the fiber optic conductor including a core and cladding, comprising:
    an alignment ferrule, wherein the cladding of the fiber optic conductor is heat fused to the ferrule without removing the cladding from the end of the fiber optic conductor; and
    an adhesive for attaching the fiber optic conductor and ferrule to a connector, wherein the adhesive has a high refractive index so as to absorb errant radiant energy that has propagated in the fiber optic conductor's cladding.

5. A fiber optic connector arrangement as claimed in claim 4, wherein the ferrule is a quartz alignment ferrule.

6. A fiber optic connector arrangement as claimed in claim 4, wherein the connector is a proximal termination connector with a coupling nut.

* * * * *